US009585174B2

(12) United States Patent
Zhu et al.

(10) Patent No.: US 9,585,174 B2
(45) Date of Patent: Feb. 28, 2017

(54) DOWNTILT SELECTION IN A FULL DIMENSIONAL MULTIPLE-INPUT MULTIPLE-OUTPUT SYSTEM

(71) Applicant: INTEL IP CORPORATION, Santa Clara, CA (US)

(72) Inventors: Yuan Zhu, Beijing (CN); Qinghua Li, San Ramon, CA (US); Xiaogang Chen, Beijing (CN); Feng Xue, Redwood City, CA (US); Hooman Shirani-Mehr, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 162 days.

(21) Appl. No.: 14/231,158

(22) Filed: Mar. 31, 2014

(65) Prior Publication Data

US 2015/0029875 A1    Jan. 29, 2015

Related U.S. Application Data

(60) Provisional application No. 61/859,121, filed on Jul. 26, 2013.

(51) Int. Cl.
*H04W 76/02* (2009.01)
*H04W 52/02* (2009.01)
(Continued)

(52) U.S. Cl.
CPC ......... *H04W 76/02* (2013.01); *H04J 11/0023* (2013.01); *H04L 5/14* (2013.01);
(Continued)

(58) Field of Classification Search
CPC ... H04W 24/08; H04W 72/082; H04W 36/30; H04W 76/02; H04W 52/0209;
(Continued)

(56) References Cited

U.S. PATENT DOCUMENTS

| | | | |
|---|---|---|---|
| 6,487,416 B1 * | 11/2002 | Bundy | H01Q 1/1257 342/374 |
| 2006/0258295 A1 * | 11/2006 | Wong | H04B 17/24 455/67.13 |

(Continued)

FOREIGN PATENT DOCUMENTS

| | | |
|---|---|---|
| EP | 2555445 A1 | 2/2013 |
| EP | 2747304 A1 | 6/2014 |

(Continued)

OTHER PUBLICATIONS

PCT Application PCT/US2014/047417; filed Jul. 21, 2014; Intel IP Corporation et al.; International Search Report mailed Nov. 4, 2014.

(Continued)

*Primary Examiner* — Christopher Grey
(74) *Attorney, Agent, or Firm* — Thorpe North & Western

(57) ABSTRACT

A technology for an enhanced node B (eNode B) in a cellular network that is operable to determine downtilt using full dimensional (FD) multiple-input multiple-output (MIMO). A plurality of orthogonal frequency division multiple access (OFDMA) signals can be transmitted, wherein each transmitted OFDMA signal is transmitted with a selected downtilt angle from a two dimensional antenna array of the eNode B. Reference signal received power (RSRP) feedback information can be received from a UE for each of transmitted OFDMA signals at the selected downtilt angles. Received signal strength indicator (RSSI) feedback information can be received from the UE. A reference signal received quality (RSRQ) can be calculated for each of the selected antennas angles using the RSRP feedback information and the RSSI feedback information. A downtilt angle can be selected for transmitting data from the eNode B with a highest signal to interference plus noise ratio (SINR).

16 Claims, 12 Drawing Sheets

(51) Int. Cl.

| | | |
|---|---|---|
| *H04W 4/00* | (2009.01) | |
| *H04L 5/14* | (2006.01) | |
| *H04W 76/04* | (2009.01) | |
| *H04W 36/00* | (2009.01) | |
| *H04W 24/08* | (2009.01) | |
| *H04W 72/08* | (2009.01) | |
| *H04W 72/04* | (2009.01) | |
| *H04W 74/08* | (2009.01) | |
| *H04L 29/06* | (2006.01) | |
| *H04W 24/02* | (2009.01) | |
| *H04W 16/28* | (2009.01) | |
| *H04J 11/00* | (2006.01) | |
| *H04W 24/10* | (2009.01) | |
| *H04W 36/30* | (2009.01) | |
| *H04W 84/12* | (2009.01) | |
| *H04W 88/06* | (2009.01) | |
| *H04W 88/08* | (2009.01) | |
| *H04L 5/00* | (2006.01) | |
| *H04W 84/18* | (2009.01) | |

(52) U.S. Cl.
CPC ............. *H04L 69/16* (2013.01); *H04W 4/005* (2013.01); *H04W 16/28* (2013.01); *H04W 24/02* (2013.01); *H04W 24/08* (2013.01); *H04W 24/10* (2013.01); *H04W 36/0066* (2013.01); *H04W 36/0083* (2013.01); *H04W 36/30* (2013.01); *H04W 52/0209* (2013.01); *H04W 72/0413* (2013.01); *H04W 72/082* (2013.01); *H04W 74/0833* (2013.01); *H04W 76/021* (2013.01); *H04W 76/023* (2013.01); *H04W 76/046* (2013.01); *H04L 5/0007* (2013.01); *H04W 84/12* (2013.01); *H04W 84/18* (2013.01); *H04W 88/06* (2013.01); *H04W 88/08* (2013.01); *Y02B 60/50* (2013.01)

(58) Field of Classification Search
CPC ............... H04W 4/005; H04W 76/046; H04W 36/0066; H04W 36/0083; H04W 72/0413; H04W 76/021; H04W 74/0833; H04W 76/023; H04W 24/02; H04W 16/28; H04W 24/10; H04L 5/14; H04L 69/16; H04J 11/0023
See application file for complete search history.

(56) References Cited

U.S. PATENT DOCUMENTS

| | | | |
|---|---|---|---|
| 2011/0103504 A1 | 5/2011 | Ma | |
| 2011/0300871 A1* | 12/2011 | Dottling | H04W 24/02 |
| | | | 455/446 |
| 2012/0195286 A1* | 8/2012 | Kim | H04L 5/0048 |
| | | | 370/330 |
| 2012/0257515 A1 | 10/2012 | Hugl et al. | |
| 2013/0301450 A1* | 11/2013 | Geirhofer | H04B 7/024 |
| | | | 370/252 |
| 2014/0211731 A1* | 7/2014 | Inoue | H04B 7/0456 |
| | | | 370/329 |
| 2014/0241198 A1* | 8/2014 | Sun | H04L 5/0048 |
| | | | 370/252 |
| 2016/0021621 A1* | 1/2016 | Wu | H04W 52/244 |
| | | | 370/311 |
| 2016/0080061 A1* | 3/2016 | Yang | H04W 24/02 |
| | | | 375/267 |

FOREIGN PATENT DOCUMENTS

| | | |
|---|---|---|
| WO | WO 2012/157870 A2 | 11/2012 |
| WO | WO 2013/024852 A1 | 2/2013 |
| WO | WO 2013/025558 A1 | 2/2013 |
| WO | WO 2013/064897 A1 | 5/2013 |
| WO | WO 2014/182383 A1 | 11/2014 |

OTHER PUBLICATIONS

PCT Application PCT/US2014/031972; filed Mar. 27, 2014; Intel IP Corporation et al.; International Search Report mailed Jul. 29, 2014.
3GPP TS 36.214 v11.1.0; 3$^{rd}$ Generation Partnership Project; Technical Specification Group Radio Access Network; Evolved Universal Terrestrial Radio Access (E-UTRA); Physical layer; Measurements; Dec. 2012; 14 pages; Release 11.
Alcatel-Lucent Shanghai Bell, et al.; Considerations on CSI feedback enhancements for high-priority antenna configurations; R1-112420, 3GPP TSG-RAN WG1#66; Aug. 2011; 7 pages; Agenda item 6.6.2.1; Athens, Greece.
NTT Docomo et al.; CSI RS Configuration to Support 4 Tx MIMO UE in 8 Tx Networks; R1-110861, 3GPP TSG RAN WG1 Meeting #64; Feb. 2011; 5 pages; Agenda Item 6.2.2; Taipei, Taiwan.
Renesas Mobile Europe Ltd.; CoMP Resource Management Set Configuration; R1-122355, 3GPP TSG-RAN WG1 Meeting #69; May 2012; 6 pages; Agenda Item 7.5.3; Prague, Czech Republic.
Samsung; CoMP RRC Parameters; R1-1212243 3GPP TSG RAN WG1 #69; May 2012; 5 pages; Agenda Item 7.5.5; Prague, Czech Republic.
3GPP TSG RAN WG1 #69—R1-122243; CoMP RRC Parameters/ Samsung; May 21-25, 2012; Prague, Czech Republic.

* cited by examiner

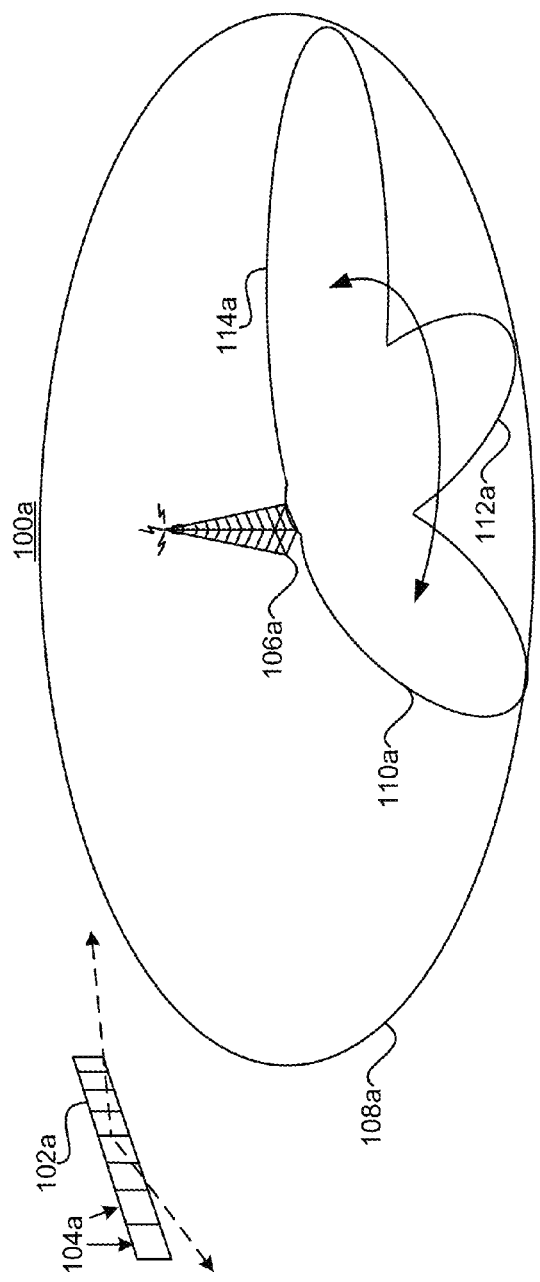
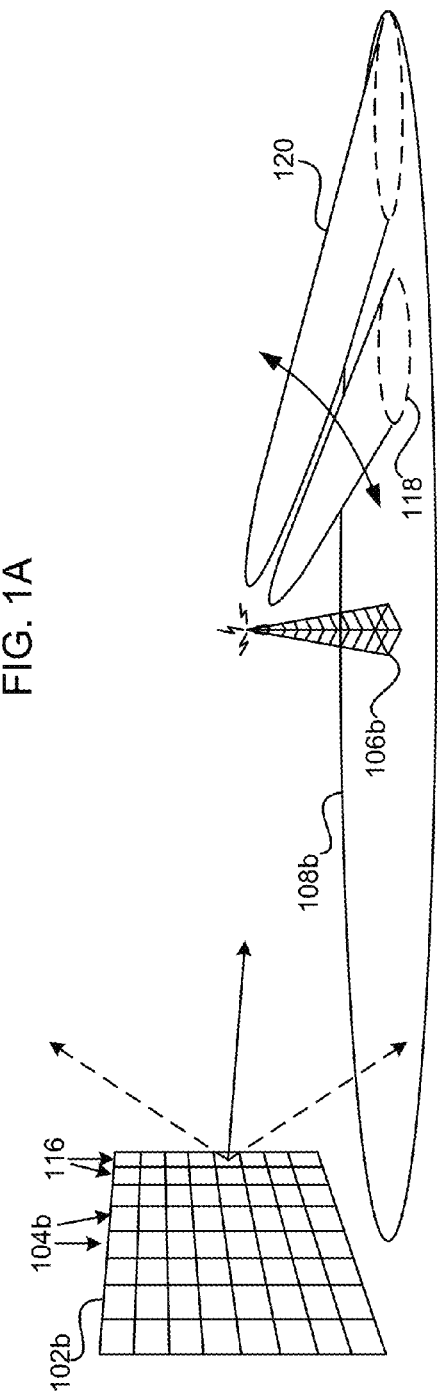
FIG. 1A
FIG. 1B

DOWNTILT SELECTION IN A FULL DIMENSIONAL MULTIPLE-INPUT MULTIPLE-OUTPUT SYSTEM

RELATED APPLICATIONS

This application claims the benefit of and hereby incorporates by reference U.S. Provisional Patent Application Ser. No. 61/859,121, filed Jul. 26, 2013.

BACKGROUND

Multiple-input and multiple-output (MIMO) technology is the use of multiple antennas at both one or more transmitters and one or more receivers. A MIMO system can be used to increase data throughput and link reliability of a network without increasing bandwidth frequencies or increasing transmit power of the network. To achieve the increased data throughput and link reliability, the data communicated between a node and a mobile device can be spread over the multiple antennas to achieve an array gain that improves the spectral efficiency and achieve a diversity gain that increases the link reliability. Massive MIMOs can deploy a large number of elements in antenna arrays. Multiple terminals can be deployed for combining a massive MIMO technology with conventional time and frequency division multiplexing using orthogonal frequency division multiplexing (OFDM).

Three-dimensional (3D) or full-dimensional (FD) MIMO systems can be used in MIMO networks to enhance the cellular performance by deploying antenna elements in both horizontal and vertical dimensions, e.g. a two dimensional (2D) antenna array. A FD MIMO system can direct communications in two dimensions, i.e. horizontally and vertically, to a location in three dimensional (3D) space. The direction of communications in 3D space can increase the directionality, allowing for increased numbers of communication paths, more focused beamforming, and increased throughput for spatial multiplexing in comparison with traditional two dimensional MIMO systems.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1A depicts a one dimensional (1D) antenna array in a two dimensional (2D) multiple-input and multiple-output (MIMO) system in accordance with an example;

FIG. 1B is a 2D antenna array in a three dimensional (3D) MIMO system in accordance with an example;

Figure 2:
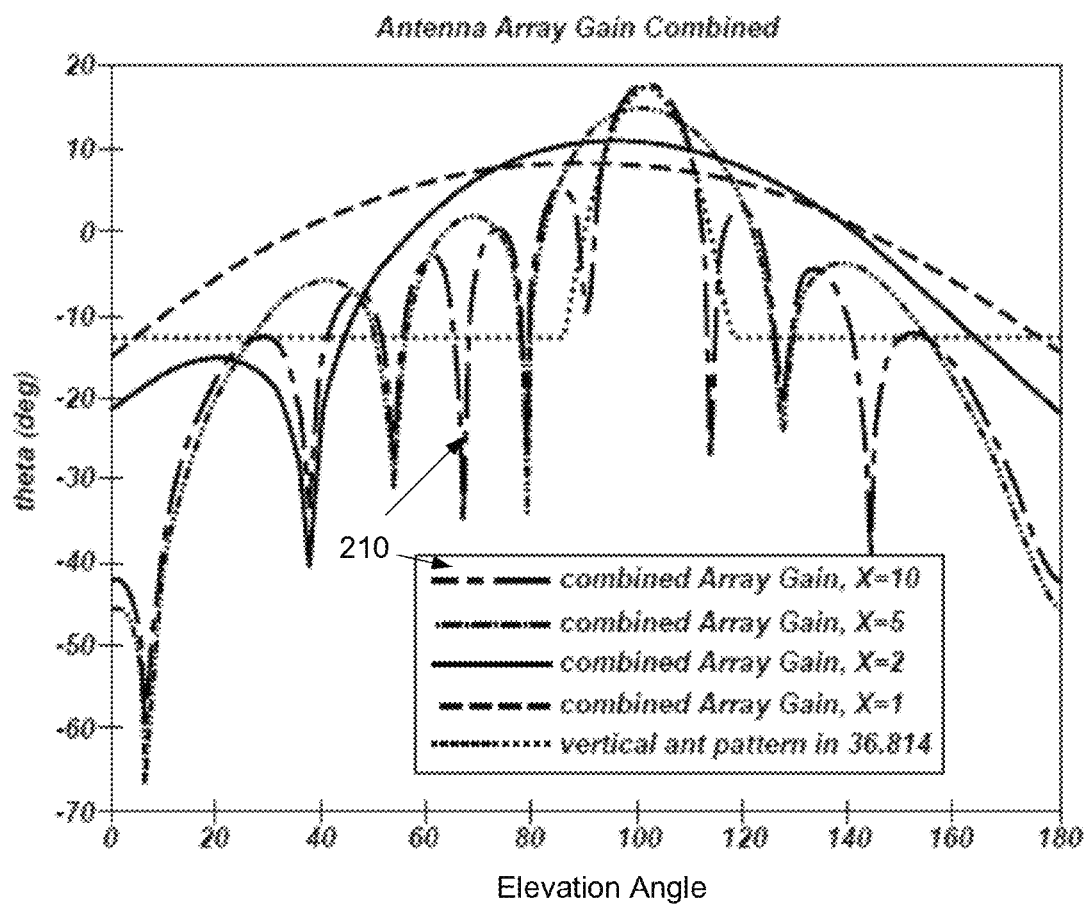
FIG. 2 illustrates a combined array gain of an antenna port that varies with the number of antenna elements in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

In a communications network, throughput can be affected by both the signal strength and interference strength. The throughput of a network can be increased by balancing a ratio between a signal strength and an interference level of nodes in a network. One technique for balancing signal strength and interference strength for nodes in a network can be to use beamforming. Beamforming can be used for an antenna array to direct or control signal transmission directions. In conventional two dimensional (2D) multiple-input and multiple-output (MIMO) systems, beamforming can be performed in a horizontal domain. A 2D MIMO system in a communication system can include a plurality of cell sites, each having a node such as an evolved Node B (eNode B) or base station, for sending and receiving signals over one or more antennas or antenna modules. In one embodiment, each antenna module can have one or more receiving antennas and one or more transmit antennas. In another embodiment, each antenna module can have one antenna to transmit and receive data.

FIG. 1A depicts a 1D antenna array 102a in a 2D MIMO system 100a. FIG. 1A further depicts a plurality of antenna elements 104a in the 1D antenna array 102a. FIG. 1A also shows two arrows emanating from the array 102a in the left and right directions. In one embodiment, the antenna array 102a can be used for spatial multiplexing in the horizontal dimension. Each of the antenna elements can correspond to an antenna port. For example, FIG. 1A shows eight antenna elements 104 that each correspond to an antenna port in the antenna array 102a. The two arrows to the right and left depict the horizontal directionality of the 1D antenna array 102a that the antenna elements 104a can be adjust to change the coverage area of the communications network.

The antenna array 102a can be mounted on a transmission point 106a, such as an enhanced Node B (eNode B), with a corresponding coverage area 108a. The horizontal directivity provided by the array is depicted by the beam direction geometries, 110a, 112a, and 114a. A beam direction geometry, also referred to as a radiation pattern, can depict a region with respect to the transmission point where a corresponding signal is highest, but the corresponding signal may be present in other regions as well. The curved arrow indicates that the three different beam direction geometries, or side lobes, that belong to a continuum of different possibilities.

FIG. 1B depicts a 2D antenna array 102b in a three dimensional (3D) or full dimensional (FD) MIMO system 100b. FIG. 1B further depicts a plurality of antenna elements 104b in the 2D antenna array 102b. The 2D array comprises antenna columns 116 in the 2D antenna array 102b. FIG. 1B also shows three arrows emanating from the antenna array 102b in different directions, two dashed arrows pointing upward and downward and the solid arrow normal to the plane of the array, depict the directionality that the antenna array 102b in the vertical dimension. The array can be mounted on a transmission point 106b, such as an eNode B, with a corresponding coverage area 108b. The vertical directivity provided by the antenna array 102b is depicted by two different beam direction geometries, a first beam direction geometry 118 and a second beam direction geometry 120. As discussed in the preceding paragraphs, a beam direction geometry can depict a region with respect to the transmission point where a corresponding signal is highest, but the corresponding signal can be present in other regions as well. The curved arrow indicates that the three different beam direction geometries or side lobes that belong to a continuum of different possibilities.

FIG. 1B depicts the antenna elements 104b of the antenna array 102b providing for vertical directionality. Additionally, the antenna elements 104b of the antenna array 102b can also provide for horizontal directionality, as discussed in the preceding paragraphs related to FIG. 1A. Therefore, the communications can be directed in two dimensions to point toward a location in three-dimensional space.

In the 3D MIMO system, a radiation pattern of a transmitting antenna at a node can be tilted along a vertical axis. The degree of the vertical tilting or the tilting angle can be measured relative to a horizontal plain of reference. The tilting angle can be referred to as the downtilt angle of the antenna. The downtilt angle of the antenna can be measured to be positive from the horizontal reference plain of the antenna towards the ground. For example, an antenna with a downtilt angle of 10 degrees tilts towards the ground at a 10 degree angle relative to the horizontal reference.

The antenna elements 104b in the antenna array 102b can have their phases and amplitudes configured to enable the antenna array 102b to transmit to a desired coverage area, which is a geographic area in which a mobile terminal can receive a signal with a sufficient strength to communicate with a node associated with the antenna array. A coverage area range and/or scope of an antenna array can be affected by the electronic downtilt angle of each antenna and/or downtilt angles of surrounding and/or adjacent antennas in the antenna array 102b.

For a traditional 2D MIMO system, the downtilt of the antenna elements in an antenna array of an eNode B can be held constant and a user equipment (UE) can measure a reference signal received power (RSRP) and/or a reference signal received quality (RSRQ) for each node associated with a cell in order to assist the eNode B to make a cell association decision. In one embodiment, the RSRP can be used for intra-frequency cell association and the RSRQ can be used for inter-frequency cell association.

RSRP can be defined as a linear average of the power contributions (in Watts) of resource elements that carry cell-specific reference signals within a selected measurement frequency bandwidth. A reference point for the RSRP can be the antenna connector of the UE. In one embodiment, when a receiver diversity is used by the UE, the RSRP may not be lower than the corresponding RSRP of any of the individual diversity branches.

For a 3D/FD MIMO system, beamforming can be performed in both the horizontal and vertical dimensions. In 3D/FD MIMO systems, elevation or vertical beamforming can be used to either increase the signal strength of a cell and/or decrease signal interference to neighboring cells. In one embodiment, elevation beamforming in 3D/FD MIMO systems can be used to optimize cell association selection by the eNode B. For example, elevation beamforming can be used to optimize an azimuth and downtilting of each cell in the 3D/FD MIMO system for different traffic distributions. In one embodiment, maximizing a signal strength or minimizing a signal interference separately or independent of each other may not optimize or increase a signal to interference ratio (SIR), signal to noise ratio (SNR), or signal to interference plus noise ratio (SINR) of a network. In one embodiment, interference minimization and signal strength maximization can be performed together to maximize the SIR, SNR, and/or SINR of a network, e.g. maximize throughput.

FIG. 2 illustrates a combined array gain of an antenna port that varies with the number of antenna elements. FIG. 2 further illustrates that constant modulus beamforming weights are applied. Curve 210 is the array gain for 10 antenna elements per antenna port. Curve 210 has a downtilt angle of 102 degrees relative to a 90 degree a horizontal direction. FIG. 2 further shows that as the downtilt is adjusted, the beamforming direction and the nulling direction can be changed or controlled. In one embodiment, an optimal downtilt can be a balance between maximizing the signal strength and minimizing the interference leakage to the neighboring cells.

Figure 3:
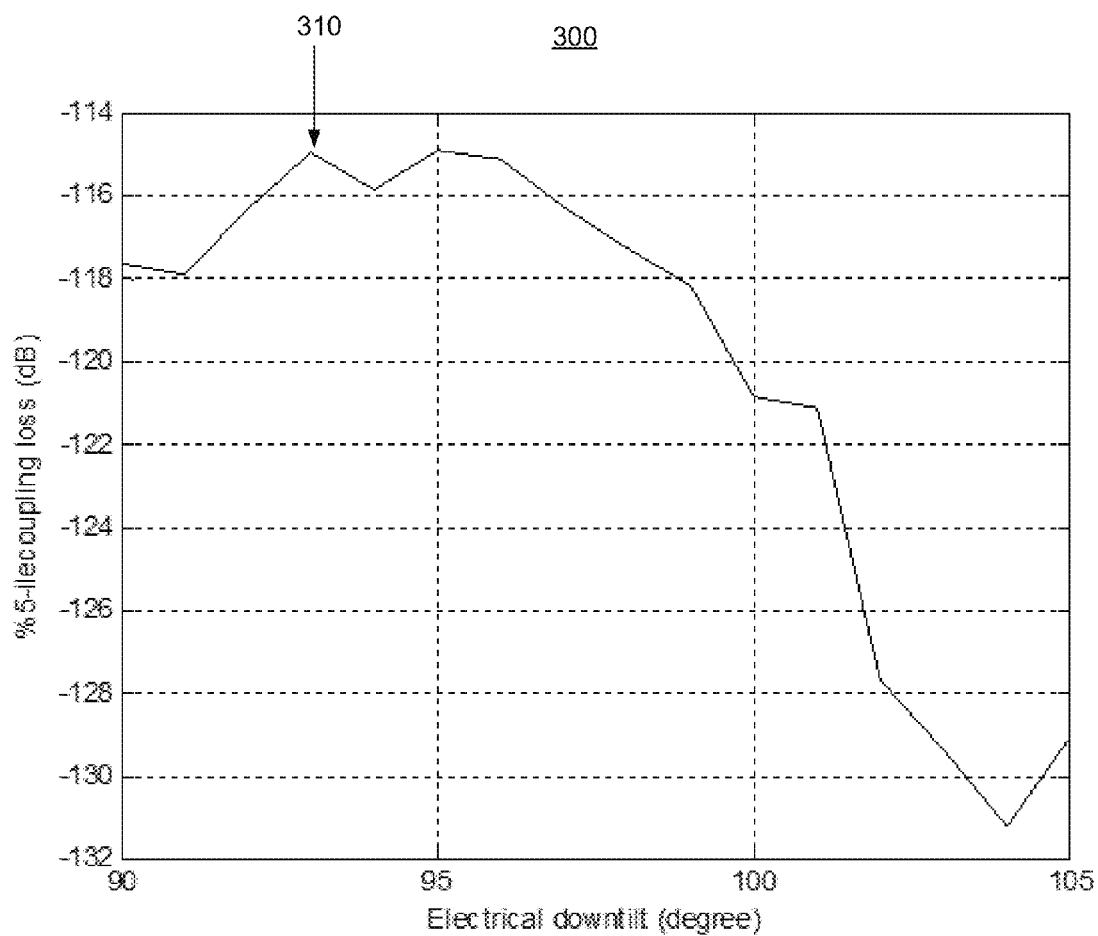
FIG. 3 illustrates a cell edge coupling loss with the same downtilt values for the enhanced Node Bs (eNode Bs) in a communications network in accordance with an example.
Figure 4:
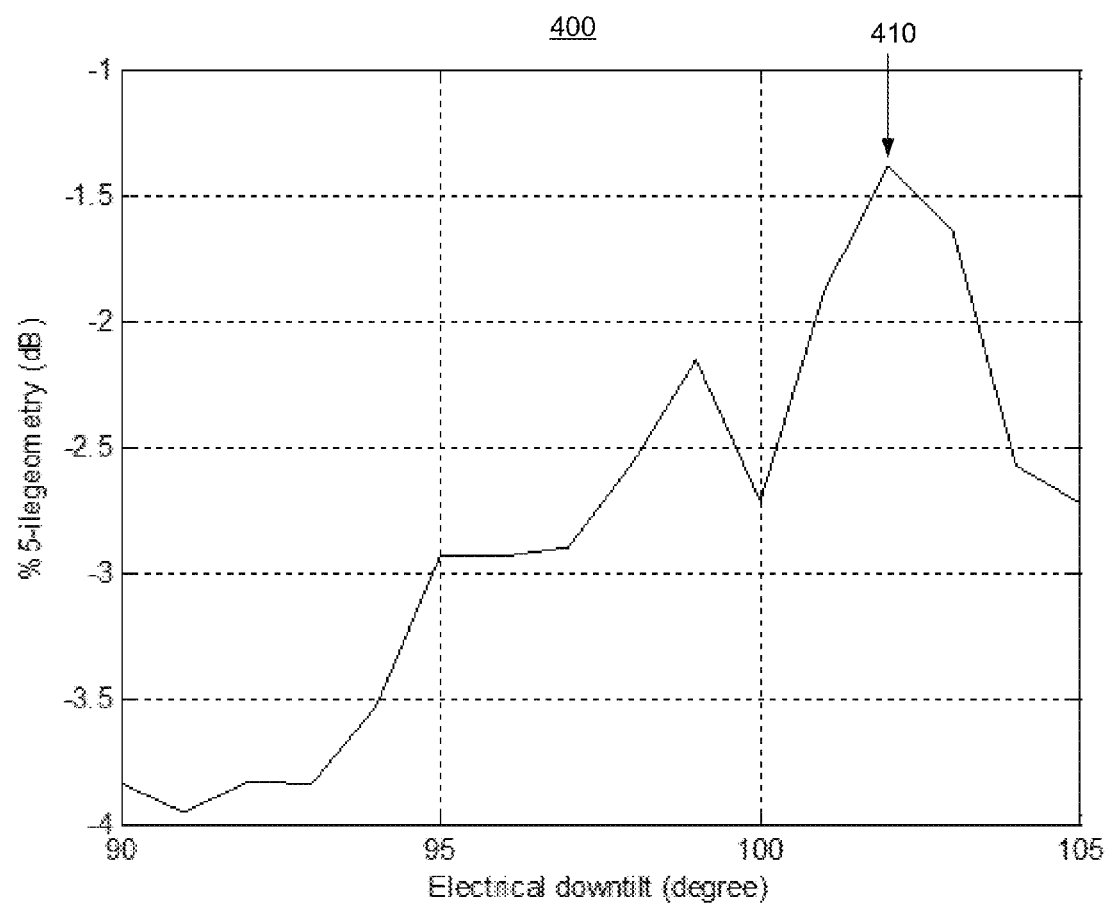
FIG. 4 illustrates a cell edge geometry with the same downtilt values for the enhanced Node Bs (eNode Bs) in a communications network in accordance with an example.

FIGS. 3 and 4 illustrate the cell edge coupling loss and geometry cumulative density function (CDF) of a serving cell for a downtilt ranging from 90 to 105 degree for the eNode Bs. In one exemplary embodiment, FIGS. 3 and 4 illustrate a communications network with 57 cells and each cell has an average of 50 active UEs.

FIG. 3 illustrates a cell edge coupling loss graph 300 with the same downtilt values for all of the eNode Bs in the communications network, with 10 UEs per cell. FIG. 3 further illustrates that the cell edge coupling loss reaches a maximum when the downtilt is at approximately 91 degrees 310.

FIG. 4 illustrates a cell edge geometry graph 400 with the same downtilt values for all of the eNode Bs in the communications network, with 10 UEs per cell. FIG. 4 illustrates that the cell edge geometry reaches a maximum when the downtilt is at approximately 102 degrees 410. In one embodiment, the difference between the downtilt angle for maximizing cell edge coupling loss in FIG. 3 and the downtilt angle for maximizing cell edge geometry in FIG. 4 can indicate that independently maximizing the signal strength or minimizing signal interference of a cell may not maximize the performance or throughput of the communications network. For example, when an individual cell performs a distributed or self-optimizing search of a downtilt angle by individual cell, an overall optimal throughput or performance for the network may not be achieved.

Traditionally in 3D/FD MIMO systems, a UE computes an RSRP in a moving average fashion and assumes that the 3D/FD MIMO system does not change any downtilt angles of a cell. Computing an RSRP using a moving average can mix distinct responses for eNode Bs with different downtilts and can prevent eNode Bs from identifying different downtilts of cells that are favorable to the overall network.

In one embodiment, a UE can compute the RSRP feedback for a selected downtilt of a cell. In another embodiment, the UE can compute the RSRP feedback for the selected downtilt of the cell without averaging the RSRP across the resource elements of other cell downtilts.

Traditionally, a mobility measurement is based on either an RSRP or an RSRQ. The RSRP can consider a common reference signal (CRS) receiving power of one cell, e.g. not reflecting the load conditions of both the cell and neighboring or adjacent cells. The RSRQ can be derived from a RSRP and the total receiving power of a cell. For example, RSRQ can be defined as a ratio N×RSRP/(evolved universal terrestrial radio access carrier received signal strength indication), where N is the number of resource blocks (RBs) of the evolved universal terrestrial radio access (E-UTRA) carrier received signal strength indication (RSSI) measurement bandwidth. In one embodiment, the NxRSRP and the E-UTRA carrier RSSI measurements can be made over a same set of resource blocks.

In one embodiment, an E-UTRA Carrier RSSI can comprise a linear average of a total received power (in Watts) observed for orthogonal frequency-division multiplexing (OFDM) symbols containing reference symbols for an antenna port, such as antenna port 0, in a measurement bandwidth, over N number of resource blocks by the UE from all sources. The sources of the network can include co-channel serving cells, non-serving cells, adjacent channel interference, thermal noise, and so forth.

When higher-layer signaling indicates selected subframes for performing RSRQ measurements, then RSSI can measured over all OFDM symbols in the indicated subframes. In one embodiment, a reference point for the RSRQ can be an antenna connector of the UE. In another embodiment, when receiver diversity is in use by the UE, a reported value may not be lower than the corresponding RSRQ of any of the individual diversity branches.

Figure 5:
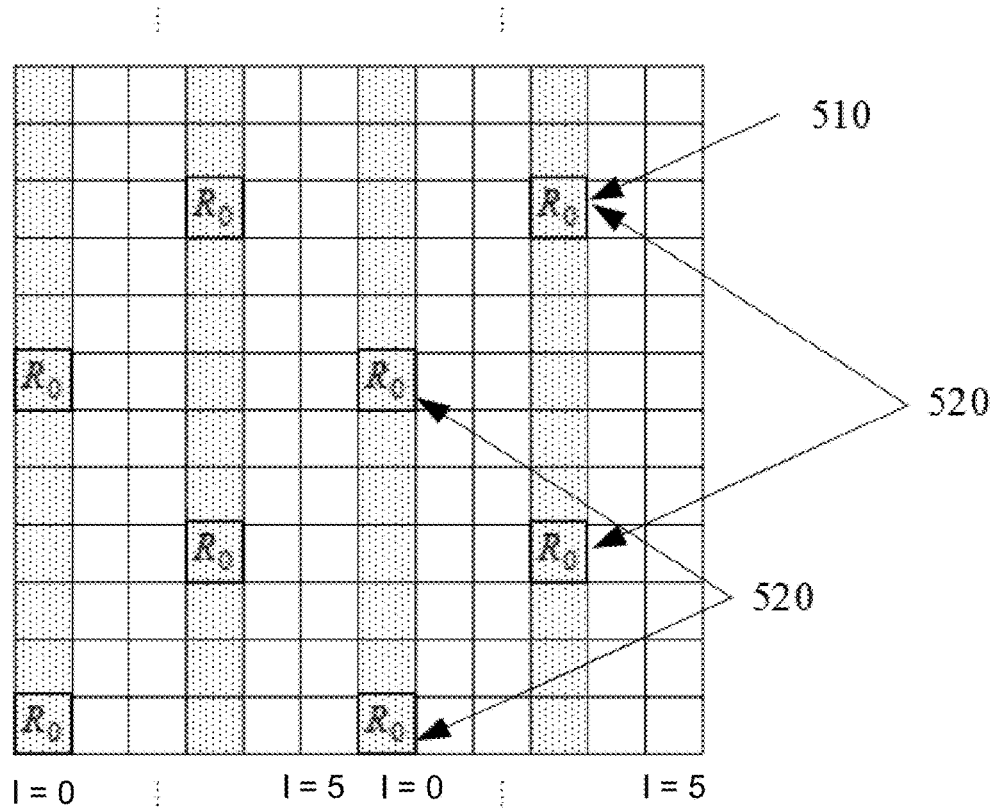
FIG. 5 depicts an reference signal received quality (RSRQ) measurement that directly samples inter-cell interference in accordance with an example.

FIG. 5 illustrates traditional RSRQ measurements. In one example, the E-UTRA RSSI can be measured as the average of total received power on all REs 510 of the OFDM reference symbols 520 containing CRS port 0. FIG. 5 also illustrates that the E-UTRA RSSI contains the receiving power of the CRS and PDSCH of neighboring cells. When neighboring cells do not transmit PDSCH, the measured E-UTRA RSSI is relatively small and the derived RSRQ is relatively high. In one embodiment, RSSI can reflect the load conditions of one or more neighboring cells.

FIG. 5 illustrates that for traditional RSRQ measurements, the RSRQ measurement directly samples the inter-cell interference, which can be generated by the CRS or PDSCH of neighboring cells. Directly sampling inter-cell interference for tuning the downtilt can be inefficient as measuring the RSRQ with an undesired downtilt can degrade the performance of the network.

In one embodiment, the eNode Bs can select the optimum downtilts by measuring different downtilts using reference signals at different downtilt angles to the UEs. Each UE can then conduct RSRQ measurements on the reference signals and communicate the RSRQ measurement information to the eNode B. This enables the eNode B to determine an optimal downtilt angle without the need to send data at different downtilts. The communication of reference signals or data at different angles is referred to as testing downtilts.

In one embodiment, radio resource management (RRM) measurements can be derived from the RSRQ of a serving cell and used to infer inter-cell interference for testing downtilts of neighboring cells. When the network obtains enough measurement reports for different testing downtilts, the network can determine the downtilts of each cell to optimize the SNR or SINR for the network.

In one embodiment, a channel-state—information interference-measurement resource (CSI-IM) can be used for CSI reporting. For example, for transmission mode 10, one CSI reporting instance can be associated with one non-zero power (NZP) CSI-RS resource and one CSI-IM to measure interference, respectively. The NZP CSI-RS can be used to measure channel response and the CSI-IM can be used to measure interference.

Figure 6:
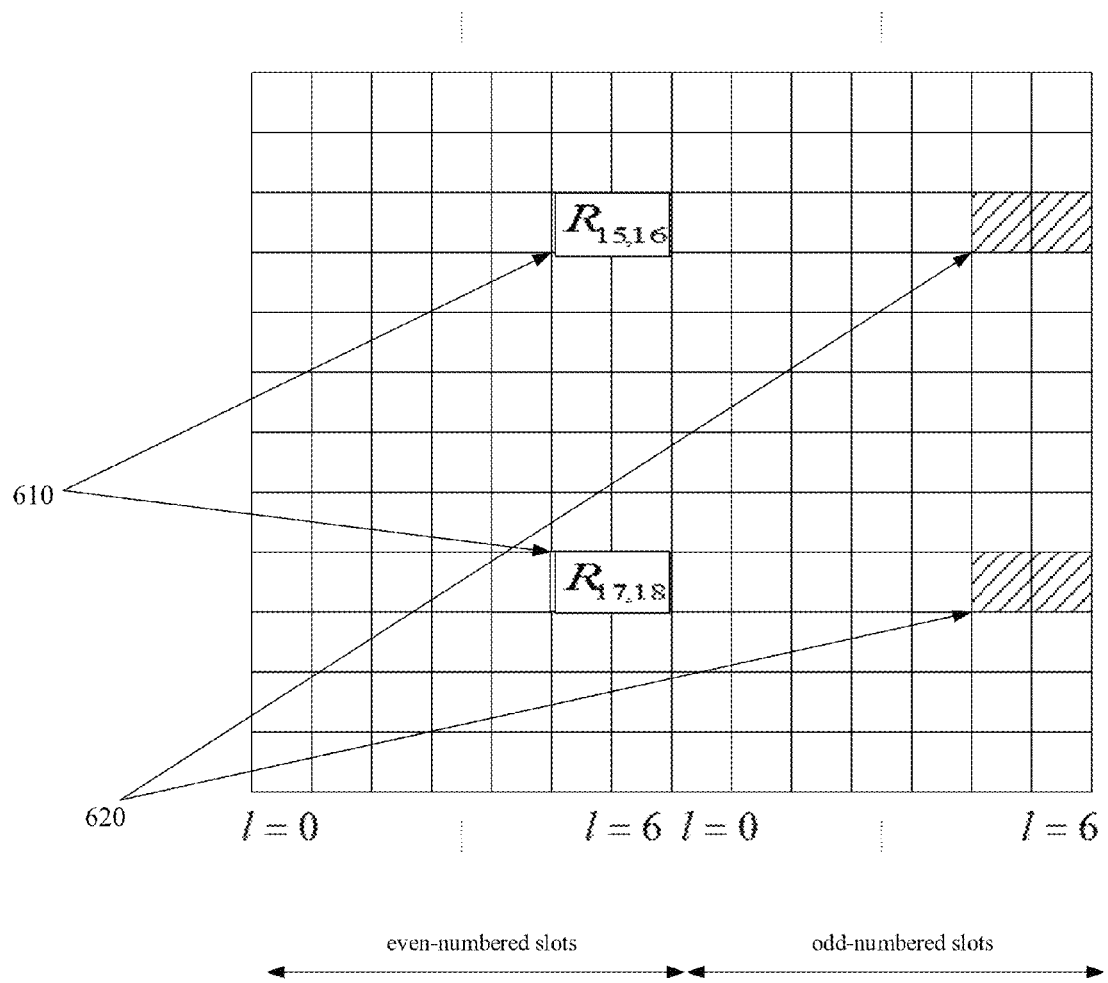
FIG. 6 illustrates RSRQ derivation from a non-zero power NZP channel-state information reference signal CSI-RS and an interference measurement resource (IMR) in accordance with an example.

In one embodiment, CSI-RS and CSI-IM can be used for downtilt control. For example, FIG. 6 illustrates that a CSI-RS based RSRQ can be derived from a non-zero power CSI-RS and a CSI-IM with new measurement or computation procedures. For example, the average power of REs of $CSI-RS_{15-18}$ 610 can be used as CSI-RS RSRP. The average receiving power of REs of interference measurement resource (IMR) 620 are used as emulated inter-cell interference. An IMR is a reference signal (RS) resource for interference measurements, such as interference assessments, at a UE for neighboring cells. In this example, a CSI-RS configuration 0 can be used for NZP CSI-RS and a configuration 4 can be used for the IMR. In one embodiment, a selected cell does not transmit reference signals on the IMR resource elements and the neighboring cells send reference signals with selected downtilts. In one example, where the test selected downtilts are not optimum for the network, neighboring cells can use the candidate downtilts for the IMR signals for non-genuine data sent from the neighboring cells to UEs in the neighboring cells.

In one embodiment, a new E-UTRA RSSI that is the denominator of the RSRQ can be different from the existing RSSI. In one embodiment, the new RSSI can be the sum of the RSRP and the averaged received power measured from the IMR REs. The new RSSI can contain information about the testing downtilts and contain no information about incumbent downtilts carrying the non-genuine data of the neighboring cells. In another embodiment, the new RSSI can be the sum of the average received power measured from NZP CSI-RS and IMR. FIG. 5 illustrates RSRQ derivation from one NZP CSI-RS and one IMR. In this embodiment, the RSSI can contain aggregated information about selected downtilts and incumbent downtilts.

In the IMR REs, the network can try different downtilts on the neighbor cells at different subframes or resource blocks. Traditionally, interference generated by different downtilts in neighboring cells is averaged by the UE and the eNode B cannot distinguish the effects of different downtilts from the RSRQ received from the UE. In one embodiment, to prevent averaging across different downtilts, restrictions and signaling can be used to assist the UE to determine an averaging region for each downtilt.

In one embodiment, the restrictions can be over subframes, physical resource blocks or REs in an IMR resource. For example, when the interference average length in time is 2 subframes, the UE can assume the interference to be constant in subframe 2n and 2n+1. In this example, the UE can use an averaged E-UTRA RSSI of subframes 2n and 2n+1 to derive the CSI-RS RSRQ in subframe 2n+1. In another example, when an interference average length in frequency is at every 2nd physical resource block (PRB), a UE can assume the interference to be constant in PRB 2n, 2n+2, 2n+4. In this example, where the UE cannot assume the interference in the even PRBs is equal to the interference in the odd PRBs, the UE can derive two different RSRQ values for the odd and even PRBs in the same subframe, respectively.

In another example, four REs of an IMR can be used for the testing of different selected downtilts. In this example, a sub-IMR can specify how interference can be averaged. In one embodiment, the sub-IMR can be a function of a subframe, a PRB index, and an RE index in one IMR. The sub-IMR can be used for unique inter-cell interference testing.

In one embodiment, the RSRP and RSRQ measurements can be for each cell of the communications network to allow the measuring of an RSRQ for each IMR or sub-IMR. The current MeasObjectEUTRA information element can be updated as below:

```
CellsToAddMod ::= Sequence {
    cellIndex              INTEGER (1..maxCellMeas),
    physCellId             PhysCellId
    cellIndividualOffset   Q-OffsetRange,
    imrIdxRsrq             ImrIdxRsrq
}
or
CellsToAddMod ::= Sequence {
    cellIndex              INTEGER (1..maxCellMeas),
    physCellId             PhysCellId
    cellIndividualOffset   Q-OffsetRange,
    subimrIdxRsrq          subImrIdxRsrq
}
```

Figure 7:
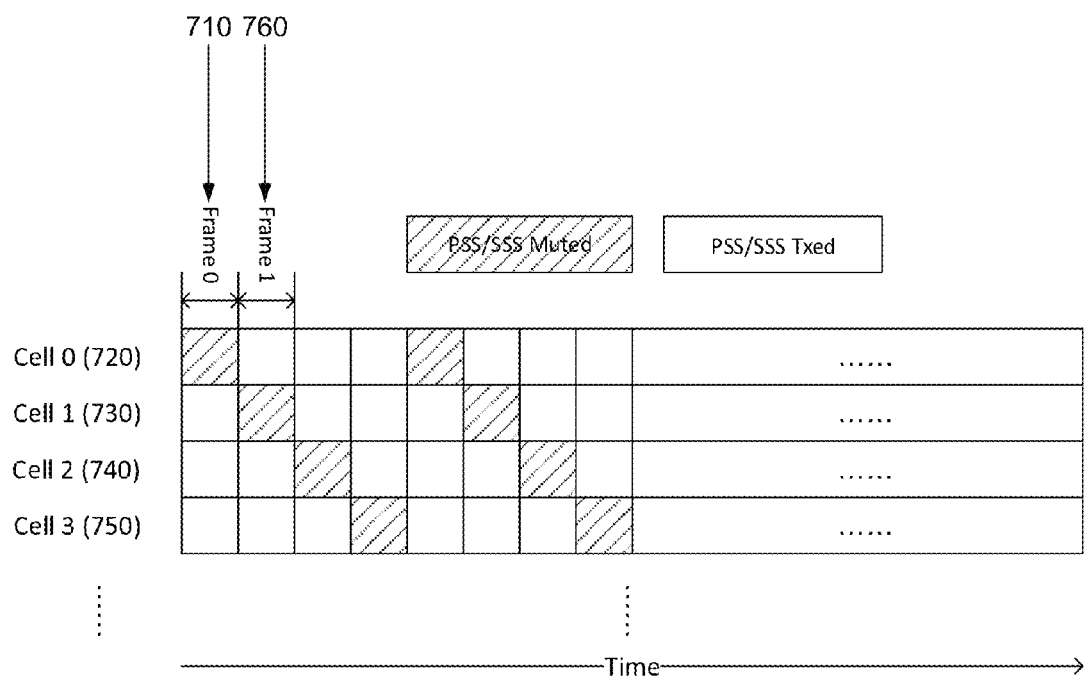
FIG. 7 illustrates different cells with different time domain muting patterns in accordance with an example.

FIG. 7 illustrates that different cells can have different time domain muting patterns. For example, FIG. 7 shows that in Frame 0 (710), the UE can measure the interference received by cell 0 (720) from the unmuted cells, i.e. cell 1 (730), cell 2 (740), and cell 3 (750), with different downtilts. The UE can measure the RSRP of cell 0 (720) in the frame where a primary synchronization signal (PSS) and/or the secondary synchronization signal (SSS) of cell 0 (720) is unmuted, e.g. frame 1 (760) as shown in FIG. 7. The number of muted cells and muting pattern discussed in the preceding paragraphs are not exhaustive and are not limiting to the number of muted cells and muting patterns. In one embodiment, the time domain measurement restriction in a CSI-RS based scheme can be applied to a PSS and/or SSS based scheme to provide an interference report.

In one example, when a UE is in a radio resource control (RRC) connected mode, the muting pattern can be transmitted to the UE using RRC signaling. For the RRC connected mode, the MeasObjectEUTRA information element can be updated as:

```
CellsToAddMod ::= Sequence {
    cellIndex              INTEGER (1..maxCellMeas),
    physCellId             PhysCellId
    cellIndividualOffset   Q-OffsetRange,
    PSS/SSS Muting pattern Bit map of PSS/SSS muting pattern
}
```

In another embodiment, when the UE is in an RRC idle mode, the muting pattern and time domain restriction can be determined using a physical cell identity (PCI).

Figure 8:
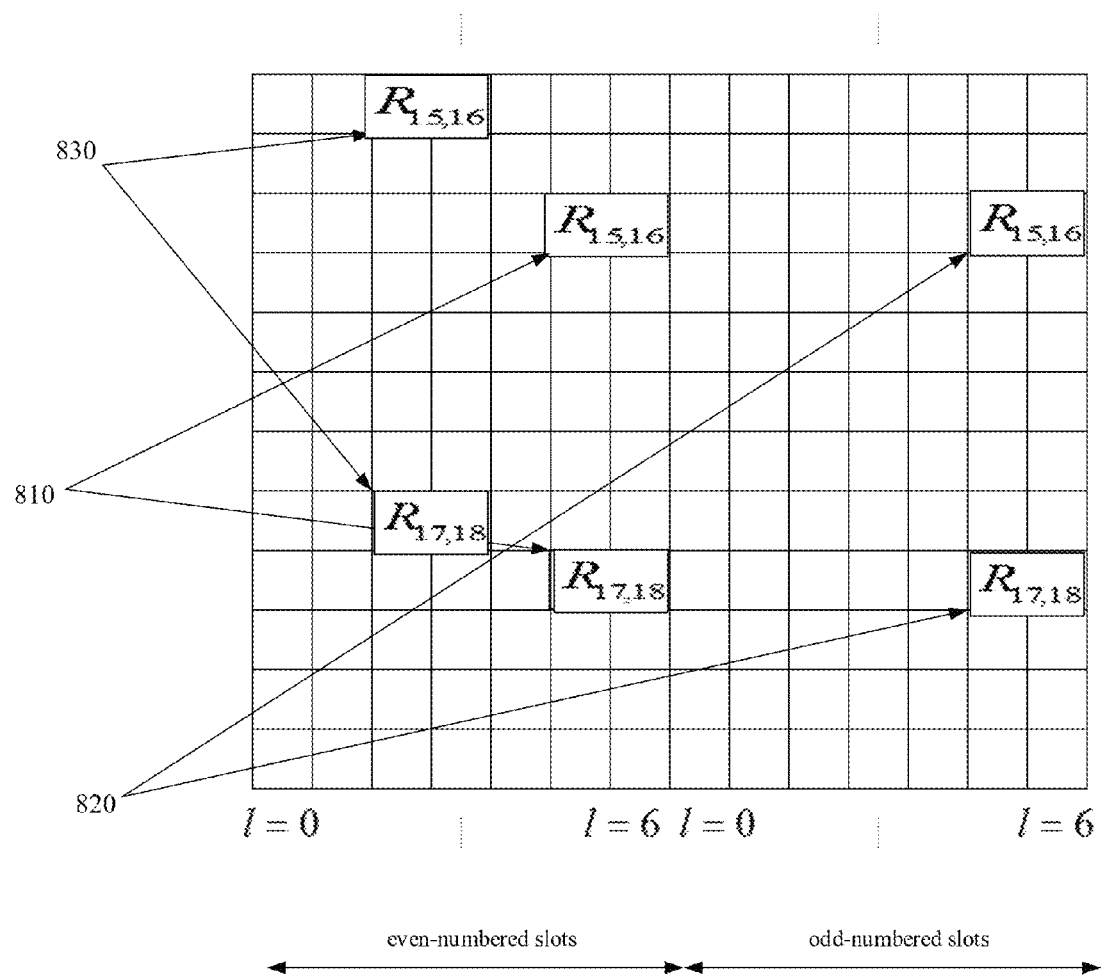
FIG. 8 illustrates using received signal strength indication (RSSI) derivation from multiple CSI-RS resources to determine an RSRQ in accordance with an example.

In another embodiment, the RSRQ can be derived using interference emulation with multiple CSI-RS resources. FIG. 8 illustrates using RSSI derivation from multiple CSI-RS resources to determine an RSRQ. FIG. 8 shows a UE configured with three CSI-RS resources, such as a first CSI-RS resource 810, a second CSI-RS resource 820, and a third CSI-RS resource 830. The average Rx power of REs of CSI-RS$_{15-18}$ can be used as the CSI-RS RSRP of the first CSI-RS resource 810. The average Rx power of REs of CSI-RS$_{15-18}$ can be used as the CSI-RS RSRP of the second CSI-RS resource 820. The average Rx power of REs of CSI-RS$_{15-18}$ can be used as the CSI-RS RSRP of the third CSI-RS resource 830.

In one embodiment, each CSI-RS resource 810-830 can be split into multiple sub CSI-RS resources, similar to the sub-IMRs discussed in the preceding paragraphs. The sub CSI-RSs can be a function of a subframe, a PRB index, and an RE index in one CSI-RS. In one embodiment, the UE can filter and report the RSRP for each sub CSI-RS to the network. In one example, where the network selected a downtilt and is aware of the downtilts used for each sub CSI-RS resource, the network can calculate the RSRQ for a selected downtilt hypothesis using the reported RSRP of the corresponding sub CSI-RSs. In another embodiment, the network can determine hand over decisions based on a calculated RSRQ.

In one embodiment, the eNode B can use a selected downtilt for the actual reference signals and data channels. The UE can generate an RSRP feedback and an RSRQ feedback for the network to determine the optimum or maximum combination of downtilts for the current network. In one embodiment, the allocations of different downtilts can be communicated to the UE for feedback computation to enable the eNode B to distinguish the effects of different downtilts on the network.

Figure 9:
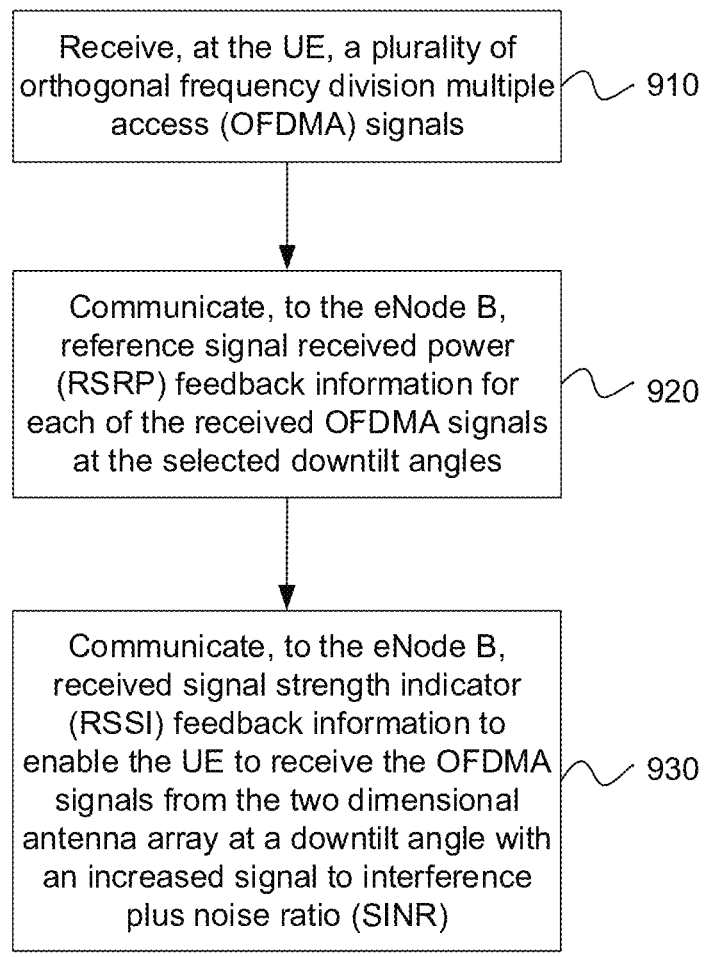
FIG. 9 depicts the functionality of the computer circuitry of a UE in a cellular network that is operable to communicate reference signal information for selected downtilt angles in accordance with an example.

Another example provides functionality 900 of computer circuitry of a UE in a cellular network that is operable to communicate reference signal information for selected downtilt angles, as shown in the flow chart in FIG. 9. The functionality can be implemented as a method or the functionality can be executed as instructions on a machine, where the instructions are included on at least one computer readable medium or one non-transitory machine readable storage medium. The computer circuitry can be configured to receive, at the UE, a plurality of orthogonal frequency division multiple access (OFDMA) signals, as in block 910. In one embodiment, each received OFDMA signal is transmitted with a selected downtilt angle from a two dimensional antenna array of the enhanced Node B (eNode B). The computer circuitry can be further configured to communicate, to the eNode B, reference signal received power (RSRP) feedback information for each of the received OFDMA signals at the selected downtilt angles, as in block 920. The computer circuitry can also be configured to communicate, to the eNode B, received signal strength indicator (RSSI) feedback information to enable the UE to receive the OFDMA signals from the two dimensional antenna array at a downtilt angle with an increased signal to interference plus noise ratio (SINR), as in block 930.

In one embodiment, the computer circuitry can be further configured to calculate the RSSI by summing the RSRP and an averaged received power measured from an IMR RE. In another embodiment, the computer circuitry can be further configured to include interference from one or more nodes adjacent to the eNode B in the cellular network by calculating the RSSI by summing an averaged received power measured from a NZP CSI-RS and an IMR. In another embodiment, the computer circuitry can be further configured to determine an averaging region for a downtilt of the one or more adjacent nodes. In another embodiment, the computer circuitry can be further configured to calculate the RSSI for one of the selected downtilt angles at each of a plurality of sub-IMRs. In another embodiment, the each of the sub-IMRs is a portion of the IMR and includes a subframe, physical resource block (PRB) index, and a resource element (RE) index. In another embodiment, the computer circuitry can be further configured to receive a sub CSI-RS for each of the selected downtilt angles, wherein the sub CSI-RS is a portion of the CSI-RS and includes a subframe, physical resource block (PRB) index, and a resource element (RE) index. In another embodiment, the computer circuitry can be further configured to filter the RSRP based on each sub CSI-RS and communicate the filtered RSRP to the eNode B. In another embodiment, the computer circuitry can be further configured to determine interference from one or more nodes adjacent to the eNode B in the cellular network by using a PSS or a SSS with a time domain muting pattern for RSRP and interference measurement. In another embodiment, the computer circuitry can be further configured to receive the PSS or SSS via radio resource control (RRC) signaling. In another embodiment, each node of the network has a different time domain muting pattern.

Figure 10:
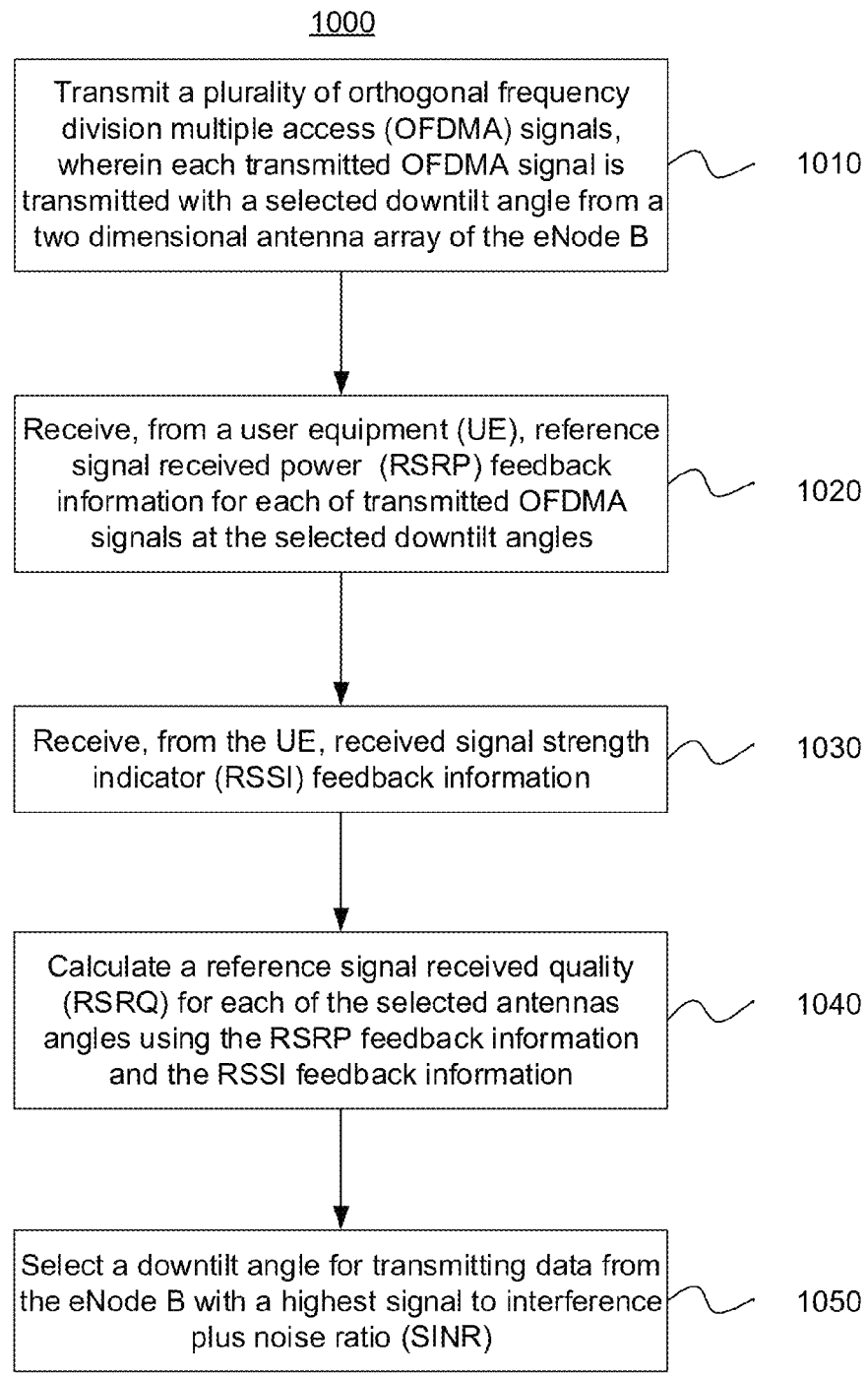
FIG. 10 depicts the functionality of the computer circuitry of an enhanced Node B (eNode B) in a cellular network that is operable to determine downtilt using full dimensional (FD) multiple-input multiple-output (MIMO) in accordance with an example.

Another example provides functionality 1000 of computer circuitry of an eNode B in a cellular network that is operable to determine downtilt using full dimensional (FD) multiple-input multiple-output (MIMO), as shown in the flow chart in FIG. 10. The functionality can be implemented as a method or the functionality can be executed as instructions on a machine, where the instructions are included on at least one computer readable medium or one non-transitory machine readable storage medium. The computer circuitry can be configured to transmit a plurality of orthogonal frequency division multiple access (OFDMA) signals, as in block 1010. In one embodiment, each transmitted OFDMA signal is transmitted with a selected downtilt angle from a two dimensional antenna array of the eNode B. The computer circuitry can be further configured to receive, from a user equipment (UE), reference signal received power (RSRP) feedback information for each of transmitted OFDMA signals at the selected downtilt angles, as in block 1020. The computer circuitry can also be configured to receive, from the UE, received signal strength indicator (RSSI) feedback information, as in block 1030. The computer circuitry can also be configured to calculate a reference signal received quality (RSRQ) for each of the selected antennas angles using the RSRP feedback information and the RSSI feedback information, as in block 1040. The computer circuitry can also be configured to select a downtilt angle for transmitting data from the eNode B with a highest signal to interference plus noise ratio (SINR), as in block 1050.

In one embodiment, the computer circuitry can be further configured to calculate an inferred inter-node interference value for one or more adjacent nodes in the cellular network based on the selected antennas angles. In another embodiment, the inter-cell interference is generated by the cell-specific reference signals (CRS) or physical downlink shared channel (PDSCH) of the one or more adjacent nodes. In another embodiment, the computer circuitry can be further configured to communicate to the UE a time domain muting pattern for RSRP measurement and interference measurement using RRC signaling. In another embodiment, the computer circuitry can be further configured to determine a channel state information reference signal (CSI-RS) based RSRQ using a non-zero power CSI-RS and a channel state information interference measurement (CSI-IM). In another embodiment, the computer circuitry can be further configured to receive RSRP for each of a plurality of sub CSI-RSs. In another embodiment, the computer circuitry can be further configured to calculate an RSRQ for a selected downtilt using an RSRP that corresponds to the sub CSI-RS.

Figure 11:
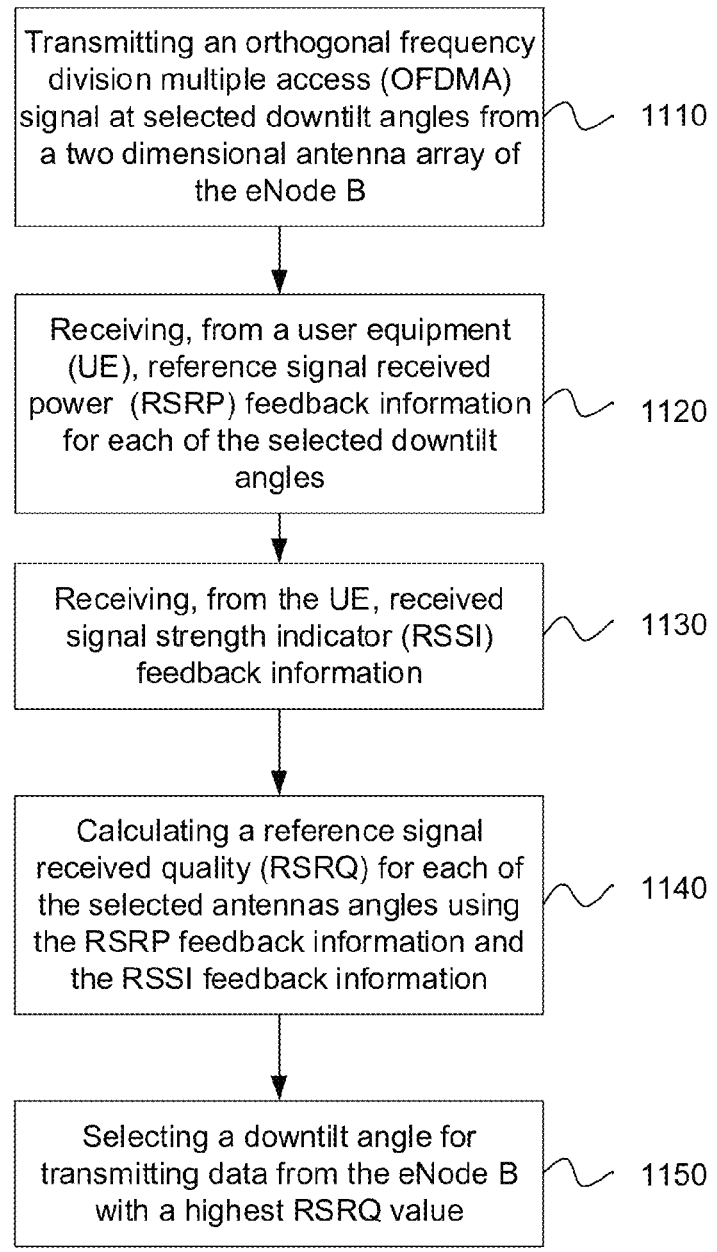
FIG. 11 illustrates a method for determining a downtilt using FD MIMO of an eNode B in a cellular network in accordance with an example.

FIG. 11 uses a flow chart 1100 to illustrate a method to determine downtilt using FD MIMO at an eNode B in a cellular network. The method can comprise of transmitting an orthogonal frequency division multiple access (OFDMA) signal at selected downtilt angles from a two dimensional antenna array of the eNode B, as in block 1110. The method can be further comprise of receiving, from a user equipment (UE), reference signal received power (RSRP) feedback information for each of the selected downtilt angles, as in block 1120. The method can also comprise of receiving, from the UE, received signal strength indicator (RSSI) feedback information, as in block 1130. The method may further comprise of calculating a reference signal received quality (RSRQ) for each of the selected antennas angles using the RSRP feedback information and the RSSI feedback information, as in block 1140. The method may further comprise of selecting a downtilt angle for transmitting data from the eNode B with a highest RSRQ value, as in block 1150.

In one embodiment, the method can further comprise receiving an RSRQ from the UE and determining a downtilt with the highest signal to noise ratio (SNR) or signal to interference plus noise ratio (SINR) based on the RSRP and the received RSRQ. In one embodiment, the method can further comprise communicating to the UE a downtilt value for a CSI-RS for each of the selected downtilt angles for the UE to use to identify a downtilt angle with a highest signal to interference plus noise ratio (SINR).

Figure 12:
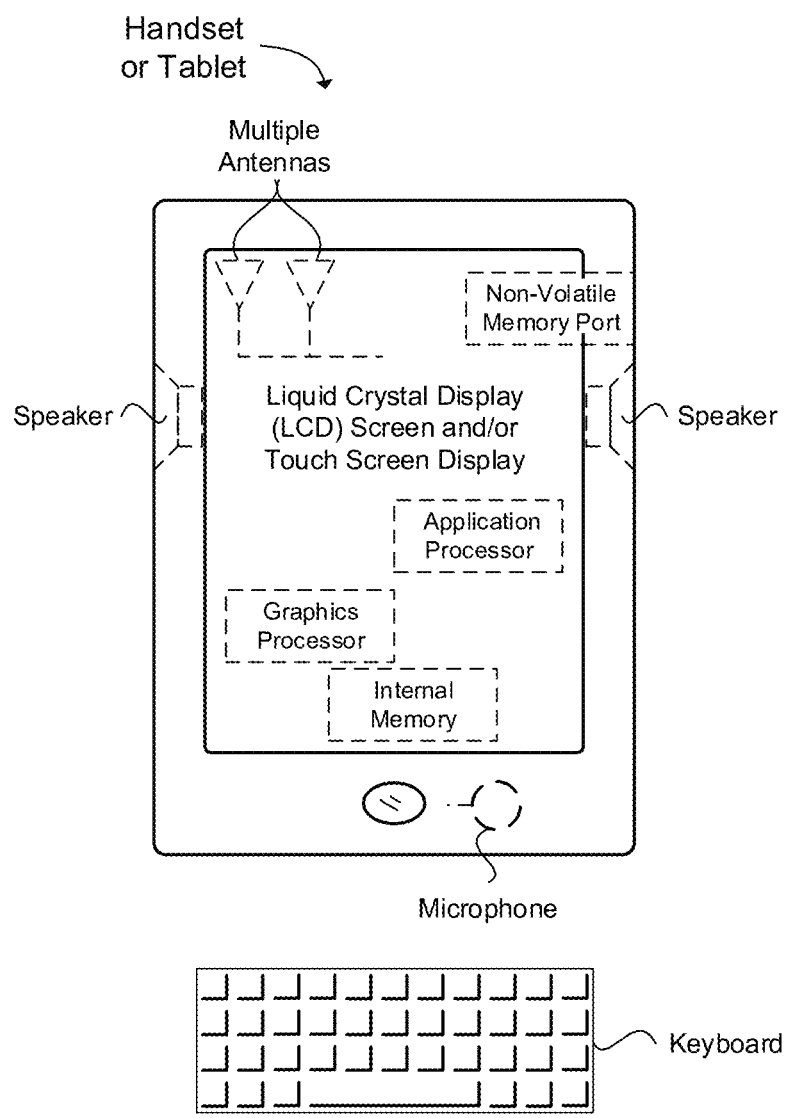
FIG. 12 illustrates a diagram of a user equipment (UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to communicate reference signal information for selected downtilt angles in a cellular network, having computer circuitry configured to:
receive, at the UE, a plurality of orthogonal frequency division multiple access (OFDMA) signals, wherein each received OFDMA signal is transmitted with a selected downtilt angle from a two dimensional antenna array of the enhanced Node B (eNode B);

communicate, to the eNode B, reference signal received power (RSRP) feedback information for each of the received OFDMA signals at the selected downtilt angles;

communicate, to the eNode B, received signal strength indicator (RSSI) feedback information to enable the UE to receive the OFDMA signals from the two dimensional antenna array at a downtilt angle with an increased signal to interference plus noise ratio (SINR);

determine interference from one or more nodes adjacent to the eNode B in the cellular network by using a primary synchronization signal (PSS) or a secondary synchronization signal (SSS) with a time domain muting pattern for RSRP and interference measurement;

include interference from one or more nodes adjacent to the eNode B in the cellular network by calculating the RSSI by summing an averaged received power measured from a non-zero power (NZP) channel state information reference signal (CSI-RS) and an interference measurement resource (IMR); and using a plurality of sub-IMRs for averaging interference and for testing one or more inter-cell interference, wherein the each of the plurality of sub-IMRs is a portion of the IMR and includes a subframe, a physical resource block (PRB) index, and a resource element (RE) index.

2. The computer circuitry of claim 1, further configured to calculate the RSSI by summing the RSRP and an averaged received power measured from an interference measurement resource (IMR) resource element (RE).

3. The computer circuitry of claim 1, further configured to determine an averaging region for a downtilt of the one or more adjacent nodes.

4. The computer circuitry of claim 3, further configured to calculate the RSSI for one of the selected downtilt angles at each of a plurality of sub-IMRs.

5. The computer circuitry of claim 1, further configured to receive a sub CSI-RS for each of the selected downtilt angles, wherein the sub CSI-RS is a portion of the CSI-RS and includes a subframe, physical resource block (PRB) index, and a resource element (RE) index.

6. The computer circuitry of claim 5, further configured to:
  filter the RSRP based on each sub CSI-RS; and
  communicate the filtered RSRP to the eNode B.

7. The computer circuitry of claim 1, further configured to receive the PSS or SSS via radio resource control (RRC) signaling.

8. The computer circuitry of claim 1, wherein each node of the network has a different time domain muting pattern.

9. An enhanced node B (eNode B) operable to determine downtilt using full dimensional (FD) multiple-input multiple-output (MIMO) in a cellular network, having computer circuitry configured to:

transmit a plurality of orthogonal frequency division multiple access (OFDMA) signals, wherein each transmitted OFDMA signal is transmitted with a selected downtilt angle from a two dimensional antenna array of the eNode B;

receive, from a user equipment (UE), reference signal received power (RSRP) feedback information for each of transmitted OFDMA signals at the selected downtilt angles;

receive, from the UE, received signal strength indicator (RSSI) feedback information;

calculate a reference signal received quality (RSRQ) for each of the selected antennas angles using the RSRP feedback information and the RSSI feedback information;

calculate an inferred inter-node interference value based on the selected downtilt angles; and select a downtilt angle for transmitting data from the eNode B with a highest signal to interference plus noise ratio (SINR);

determine a channel state information reference signal (CSI-RS) based RSRQ using a non-zero power CSI-RS and a channel state information interference measurement (CSI-IM);

calculate an RSRQ for a selected downtilt using an RSRP that corresponds to the sub CSI-RS, wherein the UE includes interference from one or more nodes adjacent to the eNode B in the cellular network by calculating the RS SI by summing an averaged received power measured from the NZP CSI-RS and an interference measurement resource (IMR) and uses the plurality of sub-IMRs for averaging interference and for testing one or more inter-cell interference, wherein the each of the plurality of sub-IMRs is a portion of the IMR and includes a subframe, physical resource block (PRB) index, and a resource element (RE) index.

10. The computer circuitry of claim 9, further configured to calculate the inferred inter-node interference value for the one or more adjacent nodes in the cellular network based on the selected antennas angles.

11. The computer circuitry of claim 10, wherein the inter-cell interference is generated by the cell-specific reference signals (CRS) or physical downlink shared channel (PDSCH) of the one or more adjacent nodes.

12. The computer circuitry of claim 10, further configured to communicate to the UE a time domain muting pattern for RSRP measurement and interference measurement using RRC signaling.

13. The computer circuitry of claim 9, further configured to receive RSRP for each of a plurality of sub CSI-RSs.

14. A method to determine downtilt using full dimensional (FD) multiple-input multiple-output (MIMO) of an evolved node B (eNode B) in a cellular network, comprising:

transmitting an orthogonal frequency division multiple access (OFDMA) signal at selected downtilt angles from a two dimensional antenna array of the eNode B;

receiving, from a user equipment (UE), reference signal received power (RSRP) feedback information for each of the selected downtilt angles;

receiving, from the UE, received signal strength indicator (RSSI) feedback information;

calculating a reference signal received quality (RSRQ) for each of the selected antennas angles using the RSRP feedback information and the RSSI feedback information;

calculate an inferred inter-node interference value based on the selected downtilt angles;

selecting a downtilt angle for transmitting data from the eNode B with a highest RSRQ value;

determine interference from one or more nodes adjacent to the eNode B in the cellular network by using a primary synchronization signal (PSS) or a secondary synchronization signal (SSS) with a time domain muting pattern for RSRP and interference measurement;

calculate an RSRQ for a selected downtilt using an RSRP that corresponds to the sub CSI-RS, wherein the UE includes interference from one or more nodes adjacent to the eNode B in the cellular network by calculating the RS SI by summing an averaged received power measured from the NZP CSI-RS and an interference measurement resource (IMR) and uses the plurality of sub-INRs for averaging interference and for testing one or more inter-cell interference, wherein the each of the plurality of sub-INRs is a portion of the IMR and includes a subframe, physical resource block (PRB) index, and a resource element (RE) index.

15. The method of claim 14, further comprising:
receiving an RSRQ from the UE; and
determining a downtilt with the highest signal to noise ratio (SNR) or signal to interference plus noise ratio (SINR) based on the RSRP and the received RSRQ.

16. The method of claim 14, further comprising communicating to the UE a downtilt value for a CSI-RS for each of the selected downtilt angles for the UE to use to identify a downtilt angle with a highest signal to interference plus noise ratio (SINR).

* * * * *